(12) United States Patent
Ellsworth

(10) Patent No.: US 11,407,963 B1
(45) Date of Patent: Aug. 9, 2022

(54) CLEANING AND DISINFECTANT COMPOSITION

(71) Applicant: BIOCIDE SOLUTIONS, LLC, Nashville, TN (US)

(72) Inventor: Thomas M. Ellsworth, Nashville, TN (US)

(73) Assignee: BIOCIDE SOLUTIONS, LLC

(*) Notice: Subject to any disclaimer, the term of this patent is extended or adjusted under 35 U.S.C. 154(b) by 0 days.

(21) Appl. No.: 16/950,131

(22) Filed: Nov. 17, 2020

(51) Int. Cl.
| | | |
|---|---|---|
| *C11D 1/72* | (2006.01) | |
| *C11D 3/32* | (2006.01) | |
| *C11D 3/04* | (2006.01) | |
| *C11D 3/395* | (2006.01) | |
| *C09K 8/52* | (2006.01) | |
| *C11D 3/20* | (2006.01) | |
| *C11D 11/00* | (2006.01) | |
| *C11D 1/722* | (2006.01) | |
| *C11D 3/39* | (2006.01) | |
| *B08B 3/10* | (2006.01) | |
| *B08B 3/08* | (2006.01) | |

(52) U.S. Cl.
CPC ............ *C11D 3/042* (2013.01); *B08B 3/08* (2013.01); *B08B 3/10* (2013.01); *C09K 8/52* (2013.01); *C11D 1/72* (2013.01); *C11D 1/722* (2013.01); *C11D 3/20* (2013.01); *C11D 3/323* (2013.01); *C11D 3/3902* (2013.01); *C11D 11/0029* (2013.01)

(58) Field of Classification Search
CPC .......... C11D 1/72; C11D 1/722; C11D 3/042; C11D 3/3902; B08B 3/08

USPC ....... 510/195, 197, 218, 234, 247, 254, 269, 510/372, 421, 499, 505, 506; 134/39, 40, 134/42

See application file for complete search history.

(56) References Cited

U.S. PATENT DOCUMENTS

| | | | |
|---|---|---|---|
| 5,672,279 A | | 9/1997 | Sargent et al. |
| 5,725,678 A | * | 3/1998 | Cannon ............... C09D 9/00 |
| | | | 134/40 |
| 8,430,971 B1 | * | 4/2013 | MacDonald ........... C11D 1/72 |
| | | | 134/42 |
| 9,103,038 B2 | * | 8/2015 | Mohs ................ C11D 3/2058 |
| 9,714,323 B2 | * | 7/2017 | Kadlec ................ C08G 77/26 |
| 10,350,653 B1 | * | 7/2019 | Dabney ................ B08B 17/00 |
| 2015/0010646 A1 | * | 1/2015 | Tiekemeier ......... C11D 3/2079 |
| | | | 424/616 |
| 2015/0344771 A1 | | 12/2015 | Jiang et al. |
| 2016/0264844 A1 | * | 9/2016 | MacDonald, II ....... C11D 7/50 |
| 2017/0015891 A1 | * | 1/2017 | Jiang ..................... C23F 11/04 |
| 2017/0349809 A1 | | 12/2017 | MacDonald |
| 2018/0179434 A1 | | 6/2018 | Dreyer et al. |

FOREIGN PATENT DOCUMENTS

WO    2006013319 A1    2/2006

\* cited by examiner

*Primary Examiner* — Gregory R Delcotto
(74) *Attorney, Agent, or Firm* — Luedeka Neely Group, PC

(57) ABSTRACT

A biodegradable cleaning and disinfectant concentrate and method for disinfecting and cleaning surfaces. The concentrate consists essentially of a reaction product of hydrochloric acid and urea; an ethoxylated alcohol surfactant; water; and optionally, a peroxide booster. The reaction product is present in an amount ranging from about 30 to about 50 percent by weight based on a total weight of the concentrate.

6 Claims, 1 Drawing Sheet

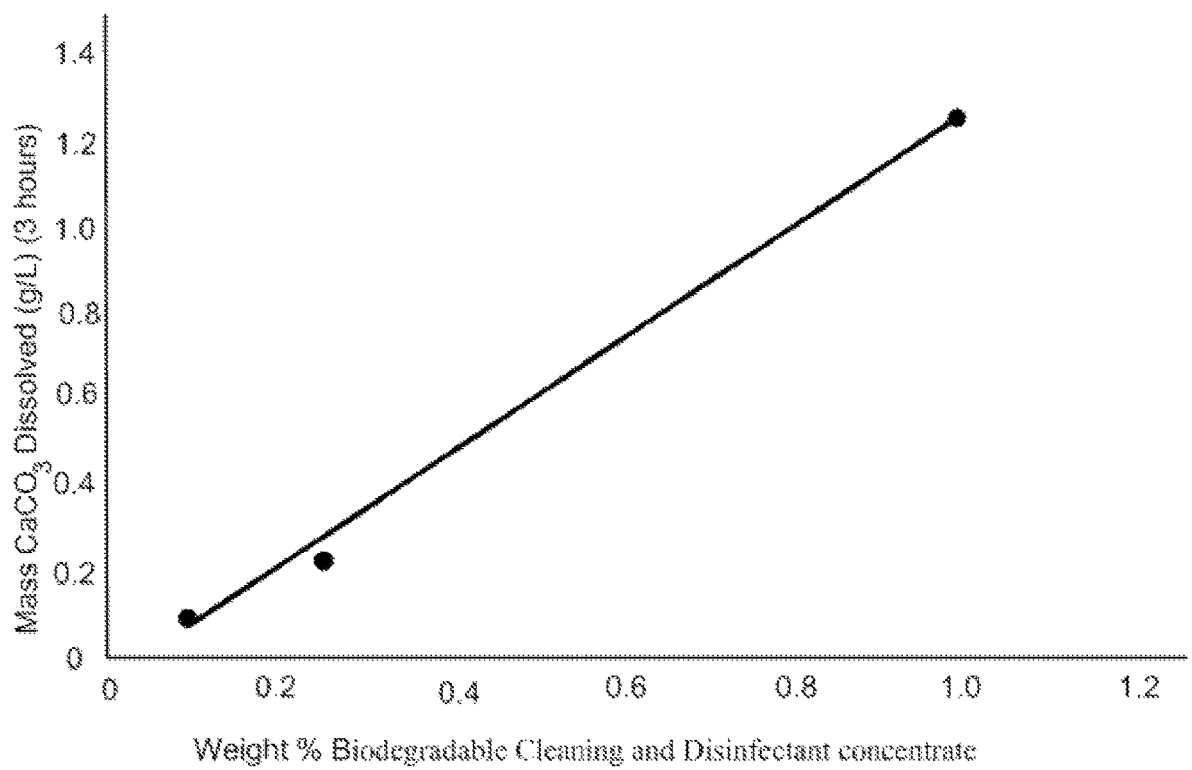

CLEANING AND DISINFECTANT COMPOSITION

TECHNICAL FIELD

The disclosure is related to chemical compositions for cleaning and disinfection and in particular to chemical compositions for removing scale and microorganisms from surfaces and pipelines.

BACKGROUND AND SUMMARY

It is common practice in the hydraulic fracturing industry activities to use water or aqueous mixtures in the extraction of product from the ground. Such fluids are used in various fluid pathways of a hydraulic fracturing system, which include conduits of wellheads and various production tubulars, and conduits of deposit or reservoir wellbores, including distant cracks and fractures in the rock of the deposit or reservoir. A common problem encountered is the formation of scale and biological deposits on the inside surfaces of such pipelines and conduits.

Water or aqueous mixtures typically contain a variety of alkaline earth metal cations, such as calcium, barium and strontium as well as a variety of anions such as bicarbonate, carbonate, sulfate, phosphate and silicate. When such ions are present in sufficient concentrations, they can combine to form precipitates. Scale formed by the deposition of any of several types of such precipitates can coat surfaces in contact with the water or aqueous mixtures. Buildup of such scale on inside surfaces of conduits can, among other things, obstruct fluid flow through the conduits. Common scales include calcium carbonate, iron sulfate, calcium sulfide, calcite, barite, celestite, anhydrite, gypsum, iron sulfide, halite and various "exotic" scales, such as calcium fluorite, zinc sulfide, and lead sulfide sometimes found, for example, within high temperature/high pressure (HT/HP) wells.

The petroleum industry technique known as hydraulic fracturing or, more informally, "hydrofracking" and "fracking," is a widely used and effective method of enhancing the recovery of oil and natural gas from deposits or reservoirs once thought to be difficult or impossible to develop economically. Hydraulic fracturing has been employed in combination with both vertical and horizontal drilling.

Hydraulic fracturing involves injecting a mixture of water, sand or sand-sized particles, and chemical additives into a subsurface petroleum reservoir at high pressure. Injection pressures create small interconnected cracks in the rock and hold open small fractures, about as wide as one or two grains of sand, in the vicinity of the well. These fractures serve as fluid pathways in the reservoir, permitting the fluids in the reservoir to flow more readily to the wellbore.

Scale inhibitors are commonly used in such production wells to prevent scaling in the formation and/or in the production lines downhole and at the surface. Scale build-up decreases permeability of the formation, reduces well productivity and shortens the lifetime of production equipment. In order to clean scales from wells and equipment it is necessary to stop the production which is both time-consuming and costly.

Current scale inhibitors and methods of using such scale inhibitors exhibit a disadvantage in that releasing the inhibitor into the well over a sustained period of time is difficult. As a result, treatments must repeatedly be undertaken to ensure that the requisite level of inhibitor is continuously present in the well. Such treatments result in lost production revenue due to down time.

Scale prevention is important to ensure continuous production from existing reserves. Scale inhibitors and treatment methods for oil and/or gas wells are therefore sought that provide scale inhibiting chemicals that may be released over a sustained period of time. It is desired that such methods not require continuous attention of operators over prolonged periods.

Extensive efforts have been invested into finding chemical additives and methods that are effective to remove scale and biological deposits from pipelines and other surfaces. Such efforts continue, indicating a clear need for disinfectants and scale inhibitors and methods of using such compositions that are effective yet biodegradable or less harmful to the environment.

In accordance with the above, embodiments of the disclosure provide a biodegradable cleaning and disinfectant concentrate and method for disinfecting and cleaning surfaces. The concentrate consists essentially of a reaction product of hydrochloric acid and urea; an ethoxylated alcohol surfactant; water; and optionally, a peroxide booster. The reaction product is present in an amount ranging from about 30 to about 50 percent by weight based on a total weight of the concentrate.

In some embodiments, the disclosure provides a method for cleaning pipelines. The method includes treating the pipelines with a dilute solution of a biodegradable cleaning and disinfectant concentrate consisting essentially of a reaction product of hydrochloric acid and urea; an ethoxylated alcohol surfactant; water; and optionally, a peroxide booster component. The reaction product is present in an amount ranging from about 30 to about 50 percent by weight based on a total weight of the concentrate. The pipeline is purged of the dilute solution of the biodegradable cleaning and disinfectant concentrate after a predetermined period of time.

In another embodiment there is provided a method for disinfecting a surface. The method includes treating the surface with a dilute solution of a disinfectant concentrate to provide a treated surface. The concentrate consists essentially of a reaction product of hydrochloric acid and urea; an ethoxylated alcohol surfactant; water; and optionally, a peroxide booster component, wherein the reaction product is present in an amount ranging from about 30 to about 50 percent by weight based on a total weight of the concentrate; and rinsing the dilution solution of the disinfectant concentrate from the treated surface after a predetermined period of time.

In some embodiments, the ethoxylated alcohol surfactant includes a mixture of C10-C14 ethoxylated alcohols, C12-C16 ethoxylated alcohols, and water.

In some embodiments, the concentrate includes from about 20 to about 30 wt. % urea based on a total weight of the concentrate.

In some embodiments, the concentrate includes from about 10 to about 20% (anhydrous basis) of hydrochloric acid based on a total weight of the concentrate.

In some embodiments, the concentrate includes from about 0.01 to about 0.04 weight percent ethoxylated alcohol surfactant based on a total weight of the concentrate.

In some embodiments, the dilution solution of the concentrate includes from about 0.1 to about 0.2 weight percent of the peroxide booster based on a total weight of the dilution solution of the concentrate. In other embodiments, the peroxide booster comprises 34 wt. % hydrogen peroxide.

In some embodiments, the disinfectant concentrate is applied to oil field fracturing pipelines. In other embodiments scale is removed from inside surfaces of the pipelines.

In other embodiments, biological species are removed from inside surface of the pipelines.

In some embodiments, the pipeline is treated with from about 0.1 to about 1 wt. % of the dilute solution of the disinfectant concentrate dissolved in water and from about 0.1 to about 0.2 weight percent of the peroxide booster component based on a total weight of the dilute solution. In other embodiments, the peroxide booster component comprises a 34 wt. % hydrogen peroxide solution in water.

The compositions described herein have a wide variety of applications in the water treatment and oil field production industries. In particular the compositions have surprisingly been found to be effective against bacteria, slime, and hard water build-up in water lines and piping. The composition may also be effective as a disinfectant for surfaces including surfaces of fruits and vegetables. Since the compositions are environmentally friendly and biodegradable, the harm to the environment is minimized by the use of the disclosed composition.

BRIEF DESCRIPTION OF THE DRAWINGS

FIG. 1 is a graphical representation of a mass of calcium carbonate dissolved in 3 hours versus a weight percent of biodegradable cleaning and disinfectant concentrate used.

DETAILED DESCRIPTION OF EXEMPLARY EMBODIMENTS

In accordance with an embodiments of the disclosure, there is provided a biodegradable cleaning and disinfectant concentrate and method for disinfecting and cleaning surfaces. The concentrate consists essentially of a reaction product of hydrochloric acid and urea; an ethoxylated alcohol surfactant; water; and optionally, a peroxide booster. The reaction product is present in the concentrate in an amount ranging from about 30 to about 50 percent by weight based on a total weight of the concentrate. The concentrate is typically diluted in water to a concentration by weight ranging from about 0.1 to about 1 weight percent of the dilute solution of the concentrate based on a total weight of the concentrate and water. The dilute solutions have a pH of less than about 3.0 and a density of from about 1.0 to about 1.2 grams/mL. Unlike other commercially available disinfectant and scale inhibitors, the composition of the disclosure is essentially biodegradable and thus less harmful to the environment.

The key components of the biodegradable cleaning and disinfectant composition are urea, hydrochloric acid (35 wt. %), and an ethoxylated alcohol surfactant dissolved in water. All of the foregoing components are highly environmental friendly and biodegradable. A typical biodegradable cleaning and disinfectant concentrate is set forth in the following table:

TABLE 1

| Component | Weight percent |
| --- | --- |
| Urea | 24 |
| Hyrochloric acid (35 wt.%) | 43 |
| Ethyoxylated alcohol surfactant | 0.025 |
| Water | balance |

The ethoxylated alcohol surfactant is a mixture of $C_{10}$-$C_{14}$-alkyl alcohol ethoxylates and $C_{12}$-$C_{16}$-alkyl alcohol ethoxylates in water. A suitable surfactant includes 90 wt. % of the ethoxylated alcohol mixture and 10 wt. % water available from Norman, Fox & Co. under the trade name NORFOX 609. The cleaning and disinfectant concentrate is 100% soluble in water.

An optional booter component comprising a peroxide solution may be used in combination with the foregoing cleaning and disinfectant concentrate. A particularly suitable booster component is a dilution solution of 34 wt. % hydrogen peroxide solution dissolved in water.

The cleaning and disinfectant concentrate may be made by first charging a tank with the appropriate mass of water for the solution. Next, a mixing device is activated and half of the total urea component is added to the tank. The urea is mixed until completely dissolved in the water (about 5 to 30 minutes). The speed of the mixing device is then reduced to prevent splashing and the hydrochoric acid component is added to the urea solution. After adding the hydrochloric acid, the second half of the urea component is added to the solution and mixed until dissolved in the solution. Finally, the speed of the mixing device is again reduced and the ethoxylated alcohol surfactant is added to the solution and mixed for an additional period of time (about 10 minutes). The resulting solution has a density ranging from about 1.14 g/mL to about 1.16 g/mL. The pH of dilute solutions made from the concentrate are shown in the following table.

TABLE 2

| Wt. % Cleaning and Disinfectant Concentrate | pH |
| --- | --- |
| 0.10 wt. % | 2.23 |
| 0.20 wt. % | 1.87 |
| 0.30 wt. % | 1.61 |
| 0.40 wt. % | 1.58 |
| 0.50 wt. % | 1.51 |
| 1.00 wt. % | 1.29 |

Surprisingly, the cleaning and disinfectant composition describe above has been found to be effective to remove dirt, debris, organic slime, calcium scale, iron deposits, and the like from pipes and pipelines. The composition was found to be most effective against carbonate-based mineral deposits such as calcium carbonate. The composition also exhibits iron removal properties which is ideal for waterlines and acid fracking for oil field applications. Mineral scale dissolution occurs at low pH levels. Accordingly, for water line cleaning, a pH of <4 is ideal. Once the pH of the solution reaches 5 (or above), the solution is essentially spent. In acid fracking applications, the cleaning and disinfectant concentrate is typically applied at a rate of from about 1-5 wt. % (2-3 wt. % average) based on active components which would be a weight ratio of urea to HCl of 1:7.5 (2 wt. %) or 1:5 (3 wt. % active).

The cleaning and disinfectant concentrate described herein may be used for shock treatment of pipes and pipelines that are clogged or show signs of visible slime build-up. In that case, the cleaning and disinfectant concentrate may be used at a rate of 3 liters per 1,000 liters of water. For best result it is desirable to hold the treatment and disinfectant composition in the pipes or pipelines for up to 12-hours and then flush the pipes and pipelines to remove foreign material.

For bi-weekly treatment to inhibit slime or hard water build-up in pipes and pipelines, cleaning and disinfectant concentrate may be used at a rate of 1-3 liters per 2,000 liters of water. Again, it is desirable to hold the treatment and disinfectant composition in the pipes or pipelines for 12-hours and then flush the pipes or pipelines to remove foreign material.

For continuous treatment to inhibit slime or hard water build-up in pipes and pipelines, the cleaning and disinfectant concentrate may be injected into the pipes or pipelines at a rate of 1 liter per 10,000-20,000 liters of water. Continuous treatment of the pipes and pipelines at the foregoing rate may provide effective and long-lasting treatment.

In order to demonstrate the effectiveness of the cleaning and disinfectant composition on scale and biological deposits in pipelines, the following examples were conducted.

Example 1

The goal of the study was to determine the rate at which the cleaning and disinfectant composition described above dissolves calcium carbonate from standard chicken eggs. Chicken egg shells are primarily composed of calcium carbonate, the primary mineral found to scale waterlines. In this study, chicken eggs were submerged in various solution strengths of the cleaning and disinfectant composition and the mass loss from the eggs was measured as the rate of calcium carbonate dissolution.

A dozen large eggs were purchased from the local market. The eggs were washed with a mild detergent to remove any film layer from the surfaces of the eggs. The eggs were then dried and left at room temperature for over an hour. Once the eggs were dried and the eggs reached room temperature, the eggs were individually numbered, weighed, and recorded. The recorded weights serves as the initial mass of the eggs prior to treatment.

A total of three different solution strengths of cleaning and disinfectant concentrate were chosen, 0.1 wt. %, 0.25 wt. %, and 1.0 wt. % dissolved in distilled water. The solutions were created by adding, 1 mL, 2.5 mL, and 10-mL of the cleaning and disinfectant concentrate to individual, 1000-mL Class A volumetric flasks. The volumetric flasks were filled to the 1000 mL line with deionized water. Each solution was divided into three, 500-mL samples.

Next, a total of three chicken eggs were chosen at random and divided into three groups consisting of one egg per group. The chicken eggs were placed into the individual solutions and left for 3-hours undisturbed. After the 3-hour treatment period, the eggs were removed from the solution and rinsed with ambient temperature tap water for 5-minutes to remove any residual chemical as well as loose minerals. The eggs were allowed to dry to 3-hours at room temperature then weighted. The dried egg weights served as the final egg masses which were compared to the initial egg masses to determine calcium carbonate mineral dissolution. The results are shown in the following table and in FIG. 1.

solutions remailed below 2.5 over the three hour period. Accordingly, it is believed that the cleaning and disinfectant composition would continue to dissolve calcium carbonate until the pH of the treatment composition was above 4.

In order to demonstrate the effectiveness of the foregoing cleaning and disinfectant composition on biological deposits, the following examples were run.

Example 2

The goal of this study was to determine the cleaning and removal properties of the cleaning and disinfectant composition on inoculated CPVC piping. Three different microorganisms were selected for this study in order to quantify the removal properties (cleaning properties) of the cleaning and disinfectant composition as well as to determine if supplementing the composition with a booster component increases the cleaning and removal properties of the composition in piping systems used for water lines. The following materials and methods were used.

*Listeria monocytogenes*

*Listeria* spp. are gram-positive, *bacillus*-shaped, soil dwelling bacteria. The major species that pertains to humans is *Listeria monocytogenes* which is a very adaptable and rugged bacterium and is the pathogen that is the causative agent for the disease listeriosis. Listeriosis is usually contracted by ingesting contaminated foods such as meat or dairy products. Prevention of listeriosis as a food illness is important and requires reliable and effective sanitation practices.

*Salmonella Typhimurium*

*Salmonella Typhimurium* is a pathogenic, gram-negative bacteria predominately found in the intestinal lumen of mammals. *Salmonella Typhimurium* is a serovar of *Salmonella enterica* which has over 2,500 different serovars. Six of the serovars are the most common human pathogens with *Salmonella Typhimurium* being one of the six. The most common foods that can harbor S. *Typhimurium* are; meat, poultry, produce, and raw eggs. Refrigerating or freezing does not destroy the bacteria but simply arrests growth. The hazardous nature of S. *Typhimurium* is the presence of an outer membrane consisting largely of lipopolysaccharides (LPS) which protects the bacteria from the environment. Strong oxidizers are typically able to penetrate the membrane and destroy S. *Typhimurium* with great efficiency.

*Escherichia coli* O157:H7

*Escherichia coli* O157:H7 is a pathogenic serotype of *Escherichia coli* and is of the Shiga toxin generating *E. coli*

TABLE 3

| Concentration (wt. %) | Starting Mass (g) | Final Mass (g) | Mass Loss (mg) | Volume Solution (L) | Mass (mg) CaCO3 Dissolved/L |
|---|---|---|---|---|---|
| 0.1 wt. % | 64.7271 | 64.6632 | 63.9 | 0.5 | 127.8 |
| 0.25 wt.% | 68.6037 | 68.4929 | 110.8 | 0.5 | 221.6 |
| 1.0 wt. % | 65.4532 | 64.7786 | 674.6 | 0.5 | 1349.2 |

The foregoing results indicated that the cleaning and disinfectant composition was effective to dissolve calcium carbonate at a relatively efficient rate. As shown in FIG. 1, there is a strong linear calcium carbonate dissolution rate exhibiting and $R^2$ of 0.9924. The pH of the treatment serotypes. *Escherichia coli* O157:H7 is one of the most common pathogens associated with food-borne illness with transmission typically caused by fecal-oral route. Common contaminated foods are raw vegetables, meat, and dairy products.

Bacterial Cultures

*Listeria monocytogenes* (Hardy Diagnostic Cat #0254FPC) was grown in *Listeria* Enrichment Broth (Criterion Cat. No.: C6030) and incubated at 35° C. for 36 hours. The bacteria were separated from the broth by centrifugation. The liquid was decanted, and the bacterial pellet was reconstituted in 1-L sterile phosphate buffer containing 5% chicken serum as the organic matter challenge.

*Salmonella Typhimurium* (ATCC® 14028) was grown in Sigma Nutrient broth at 35° C. for 48 hours. The bacteria were separated from broth by centrifugation. The liquid was decanted, and the bacterial pellet was reconstituted in 1-L sterile phosphate buffer containing 5% chicken serum as the organic matter challenge.

*Escherichia coli* (ATCC® 35150) was grown in Sigma Nutrient broth at 35° C. for 48 hours. The bacteria were separated from broth by centrifugation. The liquid was decanted, and the bacterial pellet was reconstituted in 1-L sterile phosphate buffer containing 5% chicken serum as the organic matter challenge.

CPVC Pipe Inoculation

A total of 36, 2" CPVC pipes were cut to 10-inch lengths. One end of each CPVC pipe was capped and sealed watertight. The CPVC pipes were positioned upright and divided into three groups consisting of 12-CPVC pipes per group. Next, the three prepared bacterial solutions were poured into the 12-CPVC pipes (12 pipes per group, 1-organism per group). The solution was left in the pipes for a nominal 10-minutes. Next, the pipes were carefully drained of the bacterial solution and left at ambient temperature for 3-hours ensuring bacterial attachment to the pipe walls. Next, three CPVC pipes from each group were selected and 10-mL of sterile Dey-Engley (D/E) Neutralizing broth was added to each CPVC pipe. The CPVC pipes were inverted and agitated for 20-seconds to remove any surface adhered bacteria. Next, aliquots were taken from individual CPVC pipes, serially, and plated on 3M *Listeria*, Enterobacteriaceae, and *E. coli* PETRIFILMS. The foregoing samples serves as the "Untreated" samples for the study.

Water Treatment Samples

Three CPVC Pipes from each group were selected and filled with sterile, deionized water. The water filled CPVC pipes were left undistributed and unagitated to simulate worse-case scenarios of zero agitation. After 15-minutes of contact, the liquid was drained from the pipes. 10-mL of sterile Dey-Engley (DIE) Neutralizing broth was added to each CPVC pipe. The CPVC pipes were inverted and agitated for 20-seconds to remove any surface adhered bacteria. Next, aliquots were taken from individual CPVC pipes, serially, and plated on 3M *Listeria*, Enterobacteriaceae, and *E. coli* PETRIFILMS. The foregoing water treatment samples served as the "Water Treated" samples for the study.

Cleaning and Disinfectant Composition

A 1-L solution of the cleaning and disinfectant concentrate described above was generated at the lowest concentration rate, 0.1 wt. % as product by diluting 1-mL of cleaning and disinfectant concentrate in one liter of deionized water. The solution was mixed to homogenize.

Three CPVC Pipes from the three individual groups were filled with the 0.1 wt. % cleaning and disinfectant concentrate in water. The CPVC pipe were left undistributed and unagitated to simulate worse-case scenarios of zero agitation. After 15-minutes of contact, the liquid was drained from the pipes. 10-rnL of sterile Dey-Engley (DIE) Neutralizing broth was added to each CPVC pipe. The CPVC pipes were inverted and agitated for 20-seconds to remove any surface adhered bacteria. Next, aliquots were taken from individual CPVC pipes, serially, and plated on 3M *Listeria*, Enterobacteriaceae, and *E. coli* Petrifilms™. The foregoing samples served as the "Disinfectant Treated" samples for the study.

Cleaning and Disinfectant Composition Plus Peroxide Booster

A 1-L solution of cleaning and disinfectant concentrate plus the peroxide booster component was generated at the lowest concentration rate 0.1% as concentrate and 0.13% as booster. The composition was made by diluting 1-rnL of cleaning and disinfectant concentrate and 1.3-rnL of booster component per liter of deionized water. The solution was mixed to homogenize.

The remaining three CPVC pipes from each of the three groups were filled with the 0.1% cleaning and disinfectant concentrate and 0.12% of the peroxide booster component. The CPVC pipe were left undistributed and unagitated to simulate worse-case scenarios of zero agitation. After 15-minutes of contact, the liquid was drained from the pipes. 10-rnL of sterile Dey-Engley (DIE) Neutralizing broth was added to each CPVC pipe. The CPVC pipes were inverted and agitated for 20-seconds to remove any surface adhered bacteria. Next, aliquots were taken from individual CPVC pipes, serially, and plated on 3M *Listeria*, Enterobacteriaceae, and *E. coli* PETRIFILMS. The foregoing samples served as the "Disinfectant Plus Booster" samples for the study. All growth media were incubated and the results after incubation are contained in the following tables.

TABLE 4

Listeria Monocytogenes

| Description | Avg. $Log_{10}$ (CFU/mL) | Avg. $Log_{10}$ Reduction (CFU/mL) | % Reduction |
| --- | --- | --- | --- |
| Untreated | 4.38 | In | In |
| Water Treated | 2.93 | 1.44 | 96.37 |
| Disinfectant Treated | 0.69 | 3.69 | 99.98 |
| Disinfectant Plus Booster | ND | >4.38 | >99.99 |

*Listeria Monocytogenes*

As shown in the table above, the Untreated samples had an average *Listeria monocytogenes* $log_{10}$ of 4.38-CFU/mL. Treatment with water only decreased the average $log_{10}$ to 2.94-CFU/mL which equates to a 1.44-log reduction. Treatment with 0.10 wt. % of the cleaning and disinfectant concentrate decreased the average *Listeria monocytogenes* $log_{10}$ to 0.69-CFU/mL which equates to a 3.69-$log_{10}$ reduction or a 99.98% reduction in bacteria. The combination of 0.1 wt. % of the cleaning and disinfectant concentrate and 0.12 wt. % of the peroxide booster yielded the best cleaning results with a >4.38-$log_{10}$ *Listeria monocytogenes* reduction (>99.99% reduction).

TABLE 5

Salmonella Typhimurium

| Description | Avg. $Log_{10}$ (CFU/mL) | Avg. $Log_{10}$ Reduction (CFU/mL) | % Reduction |
| --- | --- | --- | --- |
| Untreated | 5.63 | In | In |
| Water Treated | 4.01 | 1.62 | 97.601 |
| Disinfectant Treated | 1.04 | 4.59 | 99.997 |
| Disinfectant Plus Booster | ND | >5.63 | >99.999 |

*Salmonella Typhimurium*

In the above table, the Untreated samples had an average *Salmonella Typhimurium* $\log_{10}$ of 5.63-CFU/mL. Treatment with water only decreased the average $\log_{10}$ to 4.01-CFU/mL which equates to a 1.62 $\log_{10}$ reduction. Treatment with 0.10 wt. % of the cleaning and disinfectant concentrate decreased the average *Salmonella Typhimurium* $\log_{10}$ to 1.04-CFU/mL which equates to a 4.59-$\log_{10}$ reduction or a 99.997% reduction. To further boost the performance and cleaning properties of the cleaning and disinfectant concentrate, 0.12 wt. % peroxide booster was added with the 0.1 wt. % cleaning and disinfectant concentrate. The combination of 0.1 wt. % disinfectant and cleaning concentrate and 0.12 wt. % of the peroxide booster yielded the best cleaning results with a >5.63-$\log_{10}$ *Salmonella Typhimurium* reduction (>99.999% reduction).

TABLE 6

E. Coli 0157:117

| Description | Avg. Log$_{10}$ (CFU/mL) | Avg. Log$_{10}$ Reduction (CFU/mL) | % Reduction |
| --- | --- | --- | --- |
| Untreated | 5.25 | In | In |
| Water Treated | 4.04 | 1.21 | 97.430 |
| Disinfectant Treated | 0.54 | 4.71 | 99.998 |
| Disinfectant Plus Booster | ND | >5.25 | >99.999 |

*E. coli* O157:H7

According to the above table, the Untreated samples had an average *E. coli* O157:H7 logic) of 5.25-CFU/mL. Treatment with water only decreased the average $\log_{10}$ to 4.04-CFU/mL which equates to a 1.21-$\log_{10}$ reduction. Treatment with 0.10 wt. % of the cleaning and disinfectant concentrate decreased the *E. coli* O157:H7 $\log_{10}$ to 0.54-CFU/mL which equates to a 4.71-$\log_{10}$ reduction or a 99.998% reduction. To further boost the performance and cleaning properties of the cleaning and disinfectant concentrate, 0.12 wt. % peroxide booster was added with the 0.10 wt. % cleaning and disinfectant concentrate. The combination of 0.1 wt. % cleaning and disinfectant concentrate and 0.12 wt. % of the peroxide booster yielded the best cleaning results with a >5.25-$\log_{10}$ *E. coli* O157:H7 reduction (>99.999% reduction).

Overall, the results of foregoing examples demonstrated that water treatment only does not have very good cleaning properties on contaminated waterlines. Treatment with a low concentration of disinfectant and cleaning concentrate of the disclosure (0.1% product) yielded excellent cleaning results against *Listeria monocytogenes, Salmonella Typhimurium*, and *E. coli* O157:H7 inoculated CPVC waterlines. While the disinfectant and cleaning concentrate of the disclosure exhibited excellent cleaning properties, a peroxide booster may be used in conjunction with the dilution solution of the concentrate to yield even better cleaning results. The combination of the cleaning and disinfectant concentrate plus the peroxide booster component was believed to reduce the interfacial surface tension, remove mineral build-up known to harbor organic slime, and oxidize dirt, grim, and debris on the inside pipe surfaces.

The description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method for cleaning and disinfecting pipelines comprising:
    treating the pipelines with a dilute solution of a biodegradable cleaning and disinfectant concentrate consisting essentially of:
        a reaction product of hydrochloric acid and urea;
        an ethoxylated alcohol surfactant;
        water; and
        a peroxide booster component in an amount ranging from about 0.1 to about 0.2 wt. percent of the peroxide booter component based on a total weight of the dilute solution of the biodegradable cleaning and disinfectant concentrate,
        wherein the reaction product is present in an amount ranging from about 30 to about 50 percent by weight based on a total weight of the concentrate, and wherein the dilute solution of the biodegradable cleaning and disinfectant concentrate has a pH ranging from 1.29 to less than 2.5; and
    purging the pipeline of the dilute solution of the biodegradable cleaning and disinfectant concentrate after a predetermined period of time.

2. The method of claim 1, wherein the pipelines comprise oil field fracturing pipelines.

3. The method of claim 1, wherein scale is removed from inside surfaces of the pipelines.

4. The method of claim 1, wherein biological species are removed from inside surface of the pipelines.

5. The method of claim 1, wherein the biodegradable cleaning and disinfectant concentrate comprises from about 20 to about 30 wt. % urea, from about 10 to about 20% (anhydrous basis) of hydrochloric acid, and from about 0.01 to about 0.04 weight percent ethoxylated alcohol surfactant based on a total weight of the concentrate.

6. The method of claim 1, wherein the pipeline is treated with from about 0.1 to about 1 wt. % of the biodegradable cleaning and disinfectant concentrate dissolved in water.

\* \* \* \* \*